Figure 1:
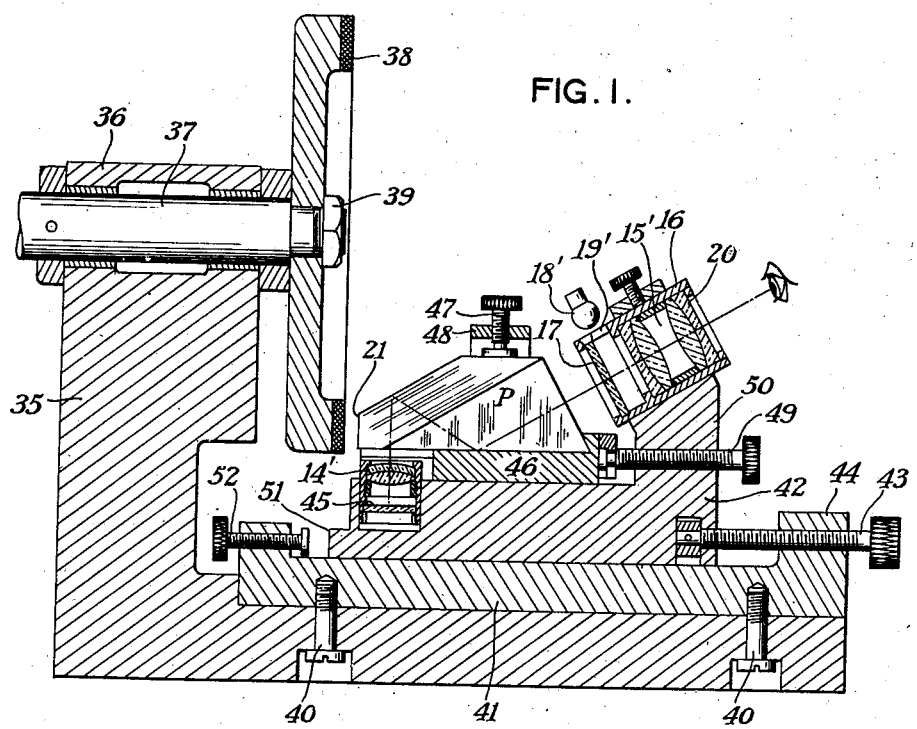

Oct. 14, 1947.                J. R. TURNER                2,428,859
        METHOD AND APPARATUS FOR ASSEMBLING OPTICAL
              PRISMS INTO AN OPTICAL SYSTEM
                  Filed March 11, 1944

JOHN R. TURNER
INVENTOR

BY

ATTORNEYS

Patented Oct. 14, 1947

UNITED STATES PATENT OFFICE 2,428,859

METHOD AND APPARATUS FOR ASSEMBLING OPTICAL PRISMS INTO AN OPTICAL SYSTEM

John R. Turner, Rochester, N. Y., assignor to Eastman Kodak Company, Rochester, N. Y., a corporation of New Jersey Application March 11, 1944, Serial No. 526,038

11 Claims. (Cl. 51—125)

The present invention relates to optics, and particularly to a method and apparatus for facilitating the assembly of optical prisms into an optical system of which they are to form a part.

The present invention relates to the manufacture of accurate optical prisms in which a round or flat surface formed on the prism is used to locate the prism in the instrument in which it is to be used. Errors in positioning a prism in an optical system introduce an error into the optical system which may add or subtract from the angle errors in the prism.

It is common practice to hold all prism angles within specified tolerances, and to hold the locating surfaces within specified tolerances with respect to the correct surfaces of the prism. This results in errors which are sometimes cumulative, and, consequently, each tolerance must be kept narrower than the optical system would otherwise require. This accuracy results in the production cost of prisms being higher than is sometimes necessary.

Inasmuch as an optical prism when placed in a system alters the path of image-forming rays between two optical elements and may be said to join the optic axis of two spaced elements, it is essential to the proper functioning of a system including a prism that the latter be properly located relative to the optic axes of the elements between which it is located in order that the image-forming rays traverse the system in a desired manner, or path. The prisms are generally provided with locating surfaces (which may be round or flat) which are to engage positioning abutments in a mount to locate the prism in the system of which it is to form a part. It is common practice to hold the physical dimensions of prisms during manufacture to close tolerances and to then shim the prisms into position if the engagement of their locating surfaces with the positioning abutments in the mount do not align the prisms satisfactorily. This individual shimming operation in the assembly of prisms has in the past been time consuming and has required the work of a skilled person; and these factors have all added to the ultimate cost, and/or have resulted in non-uniformity in quality, of optical instruments incorporating prisms.

One object of the present invention is to provide a method of assembling prisms in optical systems which is a routine procedure and which can be carried on by unskilled labor and which is conducive to assembly line technique both in the manufacture of the prisms and the final assembly thereof.

Another object is to provide a method of grinding the locating surfaces on prisms in order to correct for angle errors which may exist in the prisms.

And another object is to provide a method of assembling prisms in a mount in proper optical relation to the other optical elements carried by the mount which includes the step of providing a definite dimension between the prism positioning abutment in the mount and the optic axis of the mount, locating the prisms in an optical system which is equivalent to that in the mount and adjusting the prism until the image-forming rays pass through the prism in a satisfactory manner, and grinding the locating surface on the prism while it is in said adjusted position until the dimension between the locating surface and the optic axis of the equivalent system is equal to that dimension between the positioning wall in the mount and the optic axis of the mount.

And yet another object is to provide an apparatus for carrying out the method outlined above and which apparatus is simple in construction and easy to operate so that an unskilled operator may readily carry out the method with ease and rapidity.

Figure 2:
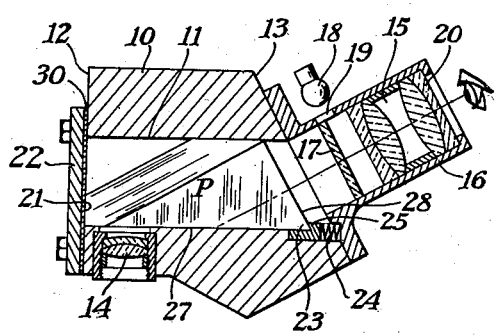
Figure 3:
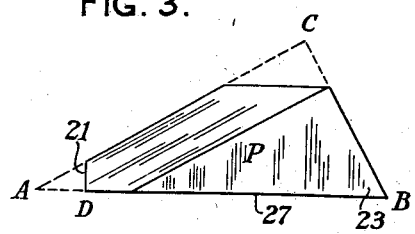
Figure 5:
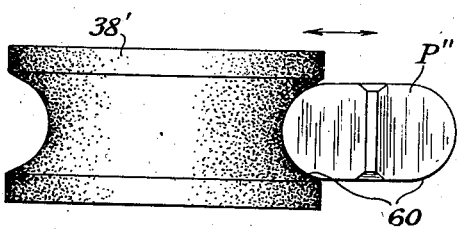
Figure 4:
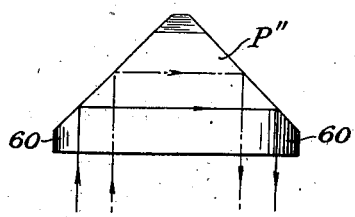

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which, Fig. 1 is a vertical sectional view of an apparatus constructed in accordance with a preferred embodiment of the present invention, Fig. 2 is a vertical sectional view of a specific type of mount including an optical prism, the location of which in the mount is facilitated by the present invention, Fig. 3 is an elevational view of a roof prism, with the edges projected to the virtual apexes, to illustrate the principles involved in locating such a prism in operative relation in an optical system, Fig. 4 is an elevational view of a Porro prism and illustrating how the optical path through such a prism is varied by altering the point at which an optic axis strikes the entrant face thereof, and Fig. 5 is an enlarged plan view showing the type of grinder which might be used in the present apparatus to grind the locating round on a Porro prism.

Like reference characters refer to corresponding parts throughout the drawings.

Briefly, in accordance with the present method of grinding the locating surface on a prism the mount in which the prism is to be located in optical relation to an optical system carried thereby is constructed so that the prism positioning wall of the mount is a fixed distance from the optic axis of the mount. The prism is then adjustably mounted in an optical system which is equivalent to that contained in the mount and is adjusted relative to said system until the image-forming rays of the system pass through the prism in a given path. The entire equivalent optical system, including the prism in its adjusted position, is then moved toward a grinding plane and a locating surface is ground on the prism to the extent that the distance from said locating surface to the optic axis of the equivalent system is equal to the corresponding distance between the positioning wall in the mount and the optic axis of the mount. Accordingly, when the prism is removed from the equivalent optical system and located in the mount by engagement between the locating surface and the positioning wall in the mount, the prism will function exactly as it did in its adjusted position in the equivalent optical system.

The virtues of the present invention will probably best be understood if the problem of mounting a prism in an optical mount be considered first. Accordingly, in Fig. 2 is shown a mount which includes a roof prism, and while this particular type of mount has been disclosed to illustrate the present invention, it will be appreciated by those skilled in the art that mounts having different optical systems including different types of prisms will present similar problems which can be solved in accordance with the teachings of the present invention.

Referring now to Fig. 2, an optical sight is shown including a mount 10 provided with a broached hole 11 extending horizontally from a vertical face 12 to an inclined face 13 of the mount. An objective 14 is fixedly positioned in the bottom wall of the mount adjacent one end of the broached hole 11. On the inclined face 13 of the mount is fixedly mounted a combined reticle and eye-piece, indicated generally as 15, whose optic axis is at an angle to the optic axis of the objective 14 and enters the end of the broached hole 11. This combined reticle and eye-piece comprises a tube 16 fixed to the inclined face of the mount and in which tube are contained the reticle 17, which may be illuminated by lamp 18 shining through an opening 19 in the edge of the tube 16, and an eye-piece 20.

The roof prism P is slipped into the broached hole 11 from the left after which it is adapted to be held in proper position by the engagement between a locating surface 21 on the left end thereof and a prism positioning wall 22 which is adapted to be secured onto the vertical face of the mount in covering relation with the broached hole 11. The right edge 23 of the prism is adapted to be seated against the action of a spring 24, or other resilient surface, situated between the positioning seat 25 and the wall of the mount.

In operation, the image-forming rays enter the objective 14 and after passing therethrough enter the entrant face 27 of the prism, and after two reflections leave the exit face 28 of the prism and pass to the eye-piece. In order for the prism to function properly, the optic axis of the objective must be joined with the optic axis of the combined reticle and eye-piece, or the image-forming rays must take a given path through the prism. If this is not true, the image entering the prism will leave the exit face of the prism at such a point that the image formed will not line up in the eye-piece with the image of the reticle, or it may not even be in a position to pass out of the exit pupil of the eye-piece.

In order that the image-forming rays pass through the prism in a given path, two things must be considered. First, the image-forming rays must enter the entrant face of the prism at a given point. Secondly, the prism angles must be correct. The vertical locating surface 21 on the prism is the only surface which can be used to control the point at which the optic axis enters the prism, and this surface is not immediately available, when the prism is manufactured, but must be ground.

This can probably best be understood from an examination of Fig. 3 which shows a roof prism, such as P, with its faces extended to form the virtual apexes A and C. Referring to Fig. 3, assuming that all of the prism angles are correct, glass paths of various lengths are available and needed to match different focal length objectives. For instance, the objective 14 in different mounts may vary slightly and in order to focus the image-forming rays at the focal plane of the eye-piece 20 (Fig. 2), or on the reticle, the length of the glass path through the prism must be varied. These various glass paths are available inasmuch, and due to different lengths AB and AC of the prism (Fig. 3) which moves surface CB away from apex A. Therefore, in order to be able to match the objectives with prisms, we must put up with prisms with various AB lengths. Consequently, the point B cannot be used as a reference point relative to the entrance beam entering the prism. Point A, on the other hand, is always at a fixed distance from the entrance beam whatever size of prism is used. But point A is a projected or virtual apex of the prism and cannot be used to locate the same. The locating surface 21 can, however, be used for the locating surface of the prism, but since A is removed in grinding surface 21 it cannot be used as a reference point to control the extent to which surface 21 is ground. The present invention, therefore, provides a simple way of grinding the locating surface 21 at a constant distance from point A, i. e., AD is constant for all prisms and DB is variable.

Consider now the second consideration in properly locating the prisms in optical relation to the optical system of the mount, namely, angle errors in the prism. Assuming slight angle errors not greater than that which the eye-piece can handle without noticing it, i. e., angle CAB in Fig. 3 varying slightly from 30°, (the prism shown being a 30°, 60°, 90° roof prism) the present method of grinding the locating surface can be made to take care of such errors. Such an error would cause the exit beam to leave the prism at a point slightly displaced from that point desired, and by slightly shifting the point at which the beam enters the prism this error can be accounted for.

The equivalent difficulties happen in Porro prisms when they are used in applications similar to ones set forth, namely, prism telescopes, etc., and their mounting in an optical mount can be facilitated in the manner set forth by the use of the present invention.

A common procedure of mounting roof prisms in mounts like the one shown in Fig. 2 consists of grinding a locating surface 21 on the prism so that the length of the entrant face 27 is constant and then shimming up the prism by the use of shims between the detachable positioning wall 22 and the locating surface 21 until the image-forming rays pass through the prism in the proper path. This procedure not only requires the services of a skilled operator who repeatedly views the image through the system while adjusting the prism location by shims, but ofttimes requires considerable time depending upon the amount of shimming that is required.

Coming now to the present invention, and referring particularly to Figs. 1 and 2, the first step in accordance with the present invention requires fabricating the mount so that the distance between the optic axis of the objective 14 and the positioning wall 22 of the mount is a given value. The prism positioning abutment may be the inside surface of the detachable member 22 itself, or a shim 30 of known thickness may be placed between the member and the locating surface of the prism if the material of the mount is not suitable for engagement by the glass prism. At any rate, it is imperative that the distance between the locating surface of the prism and the optic axis of the objective 14 be a given value when the prism is mounted so that the entrant beam will enter the prism at a given point. The objective 14 and combined eye-piece and reticle 15 are carefully centered in the mount beforehand so that the position of their optic axes are predetermined relative to one another. Then, all that is necessary is to carefully machine the vertical face 12 of the mount so that it is a given dimension from the optic axis of the objective 14, and such a problem is a routine matter in present-day mass production procedures.

The next step is to grind the locating surface 21 of the prism, and the apparatus shown in Fig. 1 is under for this step. This apparatus comprises a grinder bed, or support, 35 which may be supported on legs, not shown, and in an upright arm 36 of which a spindle 37 is rotatably mounted and is adapted to be rotated by any suitable means, not shown. On the free end of the spindle 37 a grinding element 38 is adapted to be held by a nut 39, the face of said grinding element defining a vertical grinding plane. Detachably connected to the grinder bed by bolts 40 is a plate 41.

A supporting block 42 is slidably mounted on the plate 41 to move toward and from the grinding plane, and the movement of said block is controlled by the adjusting screw 43 threaded into the upstanding lug 44 on the plate 41. Carried by the supporting block 42 is an objective 14' and a combined reticle and eye-piece 15'. The elements are the equivalent of the objective 14 and the combined reticle and eye-piece 15 carried by the mount and are disposed in the same relative position as these parts in the mount. Accordingly, these elements 14' and 15' supported by the block 42 constitute an optical system which is equivalent to the one contained by the mount in which the prism is to be mounted. Below the objective 14' there is located a mirror 45 with the reflecting surface upward and disposed at right angles to the optic axis of the objective.

The prism to be placed in the mount is then positioned on the prism supporting table 46 with the entrant face engaging the top of the table and being clamped in place by a clamping bolt 47 supported by a bracket 48 on the table, engaging the top surface of the prism as the top of the broached hole 11 in the mount does when the prism is mounted therein, see Fig. 2. It will be observed that when so positioned, the left end of the prism overhangs the end of the table 46 so that the prism cooperates with the equivalent optical system in the same manner as it cooperates with the optical system in the mount. The prism-supporting table 46 is slidably mounted on the supporting block 42 so that the prism can be adjusted laterally of the optical axis of the objective 14' by adjustment of the screw 49 threaded through the upstanding branch 50 of the block 42 and being connected to the table.

When the prism is properly supported on the table 46 the operator looks through the combined reticle and eye-piece 15' and observes the relative positions of the reticle and its image reflected back through the system by the mirror 45. The image of the illuminated reticle will enter the exit face of the prism and pass through the prism and objective to the mirror and back again. Or, stating it another way, by autocollimation the path of the image-forming rays through the objective and prism can be adjusted transversely of the optical axis of the objective 14' until the reflected image of the reticle is superimposed on the reticle itself. This adjustment of the prism is accomplished by turning the adjusting screw 49 while observing the field through the eyepiece. By this adjustment of the prism it is assured that the image-forming rays are passing through the prism in the correct path and small angle errors in the prism are also corrected for.

After the prism has been properly adjusted relative to the equivalent optical system to direct the beam in a given path, the equivalent optical system including the prism in its adjusted position is moved toward the grinding element by sliding the block 42 through the medium of the adjusting screw 43. This feeds the left-hand end of the prism, looking at Figs. 1 and 2, which overhangs the end of the box 42, into engagement with the face of the grinding element to grind the locating surface 21 on the prism. The vertex A of the prism, see Fig. 3, is generally cut off roughly to dimensions, or is in fact never formed during manufacture, so that the amount of glass that it is necessary to grind away to form the final locating surface is not too great.

The block 42 is fed toward the grinding plane until an abutment 51 on the left end of the block, see Fig. 1, strikes an adjustable stop 52. This stop is so adjusted relative to the abutment 51 and the grinding plane that the dimension from the locating surface 21 finally ground on the prism to the optic axis of the objective 14' is equal to the dimension between the positioning wall in the mount of the optic axis of the objective in the mount. Accordingly, when ground prism is located in the mount it will function in the optical system thereof in the same manner as it did in its adjusted position in the equivalent optical system, or, the image-forming rays will pass through the objective of the mount in a given path.

While I have chosen to show the grinding plane as stationary and the prism fed directly into engagement with the grinding element, it will be appreciated by those skilled in the art that certain modifications of this feeding arrangement are obvious. For example, the grinding element may be mounted to move relative to the block 42 and the two may feed towards one another simultaneously. Or, the block 42 and grinding element may be so disposed that the end of the prism will be fed past the grinding plane by the requisite amount after which the block 42 can be fed laterally of the grinding element by a cross feed to cut the locating surface on the prism in the manner of a saw. With the last mentioned procedure the face of the grinding element, defining the grinding plane, may be less subject to variation, during the grinding operation, so that the locating surface will in fact be formed at a given distance from the optic axis of the projector 14'.

It will be apparent that it is not necessary that the equivalent optical system contain exactly the same elements as the optical system in which the prism is finally mounted. In this respect, it is only necessary that the equivalent optical system have the same light path as the actual optical system, and that the prism to be ground cooperate with the same in the manner in which it is adapted to cooperate with the actual optical system.

While I have particularly discussed a roof prism in disclosing the present invention, it will be readily understood by those skilled in the art that it is also useful in grinding the locating surfaces on other types of prisms, for example, Porro prisms. As is well known, when Porro prisms are used in telescopes, it is necessary that the image-forming rays take a given path through the prism in order to have the complete optical system act on the beam in the prescribed manner. As diagrammatically illustrated in Fig. 4, the path of light through a Porro prism P" can be altered by changing the point at which the beam strikes the entrant face of the prism. In Fig. 4, the solid line shows the path of a beam entering the prism at one point, while the broken line shows the path of the beam entering the prism at another point. Therefore, if it be remembered that a Porro prism is to connect the optic axis of the objective of the telescope with the optic axis of subsequent elements in the system, the entrant face of the prism must be accurately positioned laterally of the optic axis of the objective so that the beam will take a given path through the prism and leave the exit face of the prism at a given point. This necessitates an accurate lateral disposition of the prism relative to the optical system which is to be determined by the locating surface on the prism engaging a positioning wall in the mount for the system. In this connection, the present invention can be used to eliminate the necessity of individually adjusting the prisms in each system in which they are to be used.

Since the locating surfaces on Porro prisms are generally round, as shown at 60 in Figs. 4 and 5, the grinding element 38' for grinding such surfaces should have a profile of the type illustrated in Fig. 5. Also, in grinding curved locating surfaces on Porro prisms with grinding elements of the type illustrated, it is necessary to feed the prism P" and/or grinding element 38' toward one another in endwise relation, as shown by the double arrow in Fig. 5.

From the above description, it is believed that it will be obvious to those skilled in the art that the present invention facilitates the manufacture of optical prisms and their subsequent location in mounts in proper optical relation with optical systems contained by said mounts. It facilitates the manufacture of the prisms inasmuch as it provides a means of taking care of small angle errors in prisms during the mounting of the same. By increasing tolerances allowed in prism angles the rate of manufacture of prisms is greatly increased. This invention facilitates the assembly of prisms into mounts in proper optical relation with a system contained by said mount by reason of the fact that it grinds the locating surface so that all that is necessary in mounting the prism is to slip it into position in the mount whereupon the engagement between the positioning wall in the mount and the locating surface on the prism will insure the prism being in proper optical relation with the remainder of the optical system in the mount. No individual adjustment of the prism relative to the optical system is required, as in methods used heretofore, and which individual adjustment required the services of a skilled operator and ofttimes became painstaking and time consuming with the ultimate result that the final cost of the instrument was unduly raised and successive instruments were not entirely uniform in their performance. It may properly be said that by the use of the present method and apparatus of assembling prisms, all the personal element is removed from the process with the result that better optical instruments are provided at a lower cost.

Although I have shown and described certain specific embodiments of my invention, I am fully aware that many modifications of the same are possible. My invention, therefore, is not to be restricted to the precise details of construction shown and described but is intended to cover all modifications coming within the scope of the appended claims.

Having thus described my invention, what I claim is new and desire to secure by Letters Patent of the United States is:

1. The method of assembling an optical prism in a mount including an optical system so that the prism forms a part of said system and the optical axis of the system will strike the entrant face of the prism and leave the exit face of the prism at given points on these faces, comprising the steps of providing a prism positioning abutment in said mount at a fixed distance from the point in the mount at which the optical axis of the system will enter the prism, adjustably positioning the prism in a holder provided with an optical system which is the equivalent of that in the mount and in the same optical relationship it would have in the system of the mount, observing the path of light through said prism and adjusting said prism relative to said equivalent system until the optical axis of the light beam leaves the exit face of the prism at a given point, then grinding a locating surface on said prism by moving the holder and prism so that the prism enters a grinding plane until the distance from said surface to the point at which the optical axis strikes the entrant face of the prism is equal to the distance from said positioning abutment in the mount to the point at which the optical axis of the mount will strike the entrant face of the prism when mounted therein, and finally locating the prism in said mount with said locating surface thereon in abutment with said positioning abutment.

2. The method of assembling a prism in a mount in proper optical relation to an objective also carried by the mount so that light entering said prism from said objective will pass through said prism in a given path, comprising the steps of providing a prism positioning wall in said mount at a fixed distance from the optical axis of the objective carried by the mount, adjustably positioning the prism in a holder provided with an objective equivalent to that in the mount and in the same optical relationship it is to have with said objective in the mount, observing the path of light passing through said prism and adjusting said prism relative to the objective until the light passes through said prism in a satisfactory manner, then grinding a locating surface on said prism by moving the holder and prism so that the prism enters a grinding plane until the distance from said surface to the optic axis of the equivalent objective is equal to the distance from said positioning wall in the mount to the optic axis of the objective in the mount, and finally locating the prism in said mount with said locating surface in abutment with said positioning wall.

3. The method of grinding a locating surface on an optical prism which is adapted to locate the prism in a mount in proper optical relation to other optical elements to form a complete optical system, the steps of adjustably mounting the prism in a holder provided with an optical system which is equivalent to that in which the prism is to be finally located, then observing an image formed by said equivalent system and adjusting the prism relative to the remainder of the system until the rays of light pass therethrough in the path desired when it is incorporated in the final system, and finally grinding the locating surface of said prism by moving the holder and prism so that the prism enters a grinding plane until the dimension from the locating surface to the optic axis of the equivalent system is a given value and equal to the corresponding dimension when the prism is located in the final system by said locating surface.

4. The method of grinding a locating surface on an optical prism which is adapted to locate the prism in a mount in proper optical relation to other optical elements to form a complete optical system, comprising the steps of adjustably mounting the prism in a holder provided with an autocollimating system which is adapted to pass light rays through the prism in the manner desired in the final system, observing the relative positions of the reticle and its reflected image and adjusting the prism relative to the autocollimating system until the optic axis of the rays of light leave the exit face of the prism at a given point and on the optic axis of the reticle, and finally grinding the locating surface of said prism by moving the holder and prism so that the prism enters a grinding plane until the dimension from the locating surface to the point at which the optic axis of said autocollimating system strikes the entrant face of the prism is a given value and corresponds to the dimension between the point at which the optic axis of the final system will strike the entrant face of the prism and the locating surface when the prism is located in the final mount by the same engaging a positioning abutment in the mount.

5. An apparatus for grinding the locating surface on an optical prism so that when the prism is located in a mount by engagement of said surface with a positioning abutment in the mount it will be included in, and be positioned relative to, an optical system carried by said mount whereby the optic axis of the system will strike and leave the entrant and exit faces, respectively, of the prism at given points, and comprising in combination a movable grinding element defining a grinding plane, a support, a plurality of optical elements fixed to said support in spaced relation and constituting an optical system which is the equivalent to the system in the mount and with which the prism is to cooperate, an adjustable prism support for supporting said prism in optical relationship with said equivalent optical system, means for adjusting said last mentioned means until the optical axis of said system passes through said prism in a given path, and means for bringing said grinding element and prism, while in said adjusted position, into operative relationship, and means for stopping the grinding action when the dimension from the grinding plane, which will define the position of the locating surface on the prism, to the point at which the optic axis of the system enters said prism is equal to the dimension between the positioning abutment in the mount to the point on the optic axis of the mount which will enter the prism when it is located in the mount.

6. An apparatus for grinding the locating surface on an optical prism so that when the prism is located in a mount by the engagement between said surface and a positioning abutment in the mount it will be included in, and positioned relative to, an optical system carried by said mount whereby the optic axis of the system will strike and leave the entrant and exit faces, respectively, of the prism at given points thereon, and comprising in combination a support, a movable grinding element mounted on said support and defining a grinding plane, a table adjustably mounted on said support to move toward and from said grinding plane, a plurality of optical elements fixed to said table and constituting an optical system which is equivalent to that carried by the mount, a prism supporting slide adjustably mounted on said table and adapted to support an optical prism in proper optical relationship with said equivalent system, means for adjusting said slide relative to said table to alter the point at which the optic axis of said equivalent system strikes the entrant face of the prism and consequently the point on the exit face at which the optic axis leaves the prism, and means for adjusting said table toward said grinding element after the prism has been properly adjusted relative to said equivalent optical system, until the dimension from the locating surface on the prism defined by the grinding plane, to the point at which the optic axis of the equivalent system enters the prism is equal to the dimension from the positioning abutment in the mount to the point on the optic axis of the system in the mount which will enter the prism when it is situated in the mount.

7. An apparatus according to claim 6 and including means for automatically stopping the adjustment of said table toward said grinding element when the dimension from the grinding plane to the point at which the optic axis of the equivalent system is a given value.

8. An apparatus according to claim 6 in which the equivalent optical system is an autocollimating one by the use of which the path of the optic axis through the prism can be readily ascertained.

9. An apparatus according to claim 6 in which the equivalent optical system comprises an objective lens, a reflecting surface perpendicular to the optic axis of said objective, a combined reticle and eye-piece spaced from said objective and between which objective and reticle the prism to be ground is situated and adjusted to join the optic axes of the two elements.

10. An apparatus according to claim 6 and in which said prism supporting slide and table are disposed relative to said grinding element so that the prism supported thereby will be fed directly against the surface of the grinding element by adjustment of the table, and an adjustable stop against which the table is to come into abutment to stop the feeding movement of the table when the dimension from the grinding element to the point at which the optic axis of the system enters the prism is a predetermined value.

11. An apparatus according to claim 6, and in which said prism supporting slide and table are disposed relative to said grinding element so that the prism supported thereby will be fed past the grinding element to one side thereof, an adjustable stop against which the table is to come into abutment to stop the feeding movement of the table when the dimension from the grinding plane to the point at which the optic axis of the system enters the prism is a predetermined value, and means for feeding the table, slide and prism laterally across the grinding element to grind the locating surface on the prism.

JOHN R. TURNER.

REFERENCES CITED

The following references are of record in the file of this patent:

UNITED STATES PATENTS

| Number | Name | Date |
|---|---|---|
| 1,984,121 | Drescher | Dec. 11, 1934 |
| 986,642 | Moller | Mar. 14, 1911 |
| 2,050,186 | Klemperer | Aug. 4, 1936 |
| 2,305,945 | Williams | Dec. 22, 1942 |
| 2,326,319 | Bailey | Aug. 10, 1943 |
| 2,042,018 | Papst | May 26, 1936 |
| 2,346,291 | Cisski | Apr. 11, 1944 |